(12) United States Patent
Suvorov et al.

(10) Patent No.: US 12,461,777 B2
(45) Date of Patent: Nov. 4, 2025

(54) DIRECT LAUNCH FOR ASYNCHRONOUS ACTIONS

(71) Applicant: Oracle International Corporation, Redwood Shores, CA (US)

(72) Inventors: Vadim Suvorov, Redmond, WA (US); Jonathan Luke Herman, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 469 days.

(21) Appl. No.: 17/983,758

(22) Filed: Nov. 9, 2022

(65) Prior Publication Data

US 2024/0152389 A1 May 9, 2024

(51) Int. Cl.
G06F 9/48 (2006.01)
G06F 9/54 (2006.01)
G06F 11/34 (2006.01)

(52) U.S. Cl.
CPC .............. G06F 9/485 (2013.01); G06F 9/546 (2013.01); G06F 11/3419 (2013.01)

(58) Field of Classification Search
None
See application file for complete search history.

(56) References Cited

U.S. PATENT DOCUMENTS

| 8,949,834 | B2 | 2/2015 | Olston |
| 9,183,049 | B1 | 11/2015 | Corley et al. |
| 10,310,896 | B1 | 6/2019 | Kichak et al. |
| 10,698,767 | B1 * | 6/2020 | De Kadt ............. G06F 16/2315 |
| 11,256,547 | B2 | 2/2022 | Casotto |
| 11,522,799 | B1 * | 12/2022 | Koutsikos Tsatsalmas ................. H04L 41/0627 |
| 2006/0048217 | A1 * | 3/2006 | Watkins ................ H04L 67/563 726/11 |
| 2008/0209435 | A1 | 8/2008 | Dong et al. |
| 2012/0060165 | A1 | 3/2012 | Clarke |

(Continued)

OTHER PUBLICATIONS

Hilman et al., "Workflow-as-a-Service Cloud Platform and Deployment of Bioinformatics Workflow Applications", Available Online at: 2006.01957.pdf (arxiv.org), Apr. 2021, 29 pages.

(Continued)

*Primary Examiner* — Charles E Anya
(74) *Attorney, Agent, or Firm* — Kilpatrick Townsend & Stockton LLP

(57) ABSTRACT

Techniques are disclosed herein for a direct launch for asynchronous actions. An example method can include receiving, by a device, a first workflow request, wherein the device comprises a first launcher in operable communication with a second launcher via a shared queue, and wherein a first duplicate of the first workflow request is stored in the shared queue is to be retrieved by the second launcher upon an elapsing of a threshold time interval. The device can transmit the workflow request to an application for executing the first workflow request, wherein the transmission is prior to the threshold time elapsing. The device can determine whether the application initiated a workflow to process the workflow request. The device can update the first duplicate of the first workflow request stored at the shared queue based at least in part on the determination and prior to the threshold time interval elapsing.

17 Claims, 12 Drawing Sheets

(56) References Cited

U.S. PATENT DOCUMENTS

| | | | | |
|---|---|---|---|---|
| 2012/0303720 | A1* | 11/2012 | Rajasekar | G06F 9/4843 |
| | | | | 709/206 |
| 2014/0188978 | A1 | 7/2014 | Ng et al. | |
| 2021/0405915 | A1* | 12/2021 | Agarwal | G06F 3/0604 |
| 2023/0036900 | A1* | 2/2023 | Liguori | G06Q 10/0633 |

OTHER PUBLICATIONS

Kumar et al., "An Approach to Workflow Scheduling Using Priority in Cloud Computing Environment", International Journal of Computer Applications (0975-8887), vol. 109, No. 11, Available Online at: https://citeseerx.ist.psu.edu/viewdoc/download?doi=10.1.1.695.6092&rep=rep1&type=pdf, Jan. 2015, pp. 32-38.

Thyagarajan et al., "A Model for an Optimal Approach for Job Scheduling in Cloud Computing", International Journal of Engineering Research & Technology (IJERT), vol. 2, Issue 10, Available Online at: https://www.ijert.org/research/a-model-for-an-optimal-approach-for-job-scheduling-in-cloud-computing-IJERTV2IS100965.pdf, Oct. 2013, pp. 3561-3564.

Wang et al., "Workflow as a Service in the Cloud: Architecture and Scheduling Algorithms", Procedia Computer Science, vol. 29, Available Online at: https://www.ncbi.nlm.nih.gov/pmc/articles/PMC5796789/, 2014, pp. 546-556.

* cited by examiner

DIRECT LAUNCH FOR ASYNCHRONOUS ACTIONS

BACKGROUND

A cloud service provider (CSP) can provide multiple cloud services to subscribing customers. These services are provided under different models, including a Software-as-a-Service (SaaS) model, a Platform-as-a-Service (PaaS) model, an Infrastructure-as-a-Service (IaaS) model, and others.

BRIEF SUMMARY

The present embodiments relate to a direct launch for asynchronous actions. A first embodiment can include a method for a direct launch for asynchronous actions. The method can include receiving a first workflow request, wherein the computing device comprises a first launcher in operable communication with a second launcher via a shared queue, and wherein a first duplicate of the first workflow request is stored in the shared queue is to be retrieved by the second launcher upon an elapsing of a threshold time interval.

The method can further include transmitting the workflow request to an application for executing the first workflow request, wherein the transmission is prior to the threshold time elapsing.

The method can further include determining whether the application initiated a workflow to process the workflow request.

The method can further include updating the first duplicate of the first workflow request stored at the shared queue based at least in part on the determination and prior to the threshold time interval elapsing.

A second embodiment can include a device including a processor; and computer-readable medium including instructions that, when executed by the processor, cause the processor to perform operations including receiving a first workflow request, wherein the computing device comprises a first launcher in operable communication with a second launcher via a shared queue, and wherein a first duplicate of the first workflow request is stored in the shared queue is to be retrieved by the second launcher upon an elapsing of a threshold time interval.

The instructions that, when executed by the processor, can further cause the processor to perform operations including transmitting the workflow request to an application for executing the first workflow request, wherein the transmission is prior to the threshold time elapsing.

The instructions that, when executed by the processor, can further cause the processor to perform operations including determining whether the application initiated a workflow to process the workflow request; and The instructions that, when executed by the processor, can further cause the processor to perform operations including updating the first duplicate of the first workflow request stored at the shared queue based at least in part on the determination and prior to the threshold time interval elapsing.

A third embodiment can include a computer-readable medium having stored thereon a sequence of instructions which, when executed, causes a processor to perform operations including receiving a first workflow request, wherein a device executing the instructions comprises a first launcher in operable communication with a second launcher via a shared queue, and wherein a first duplicate of the first workflow request is stored in the shared queue is to be retrieved by the second launcher upon an elapsing of a threshold time interval;

The instructions that, when executed by the processor, can further cause the processor to perform operations including transmitting the workflow request to an application for executing the first workflow request, wherein the transmission is prior to the threshold time elapsing;

The instructions that, when executed by the processor, can further cause the processor to perform operations including determining whether the application initiated a workflow to process the workflow request; and The instructions that, when executed by the processor, can further cause the processor to perform operations including updating the first duplicate of the first workflow request stored at the shared queue based at least in part on the determination and prior to the threshold time interval elapsing.

DETAILED DESCRIPTION

Figure 1:
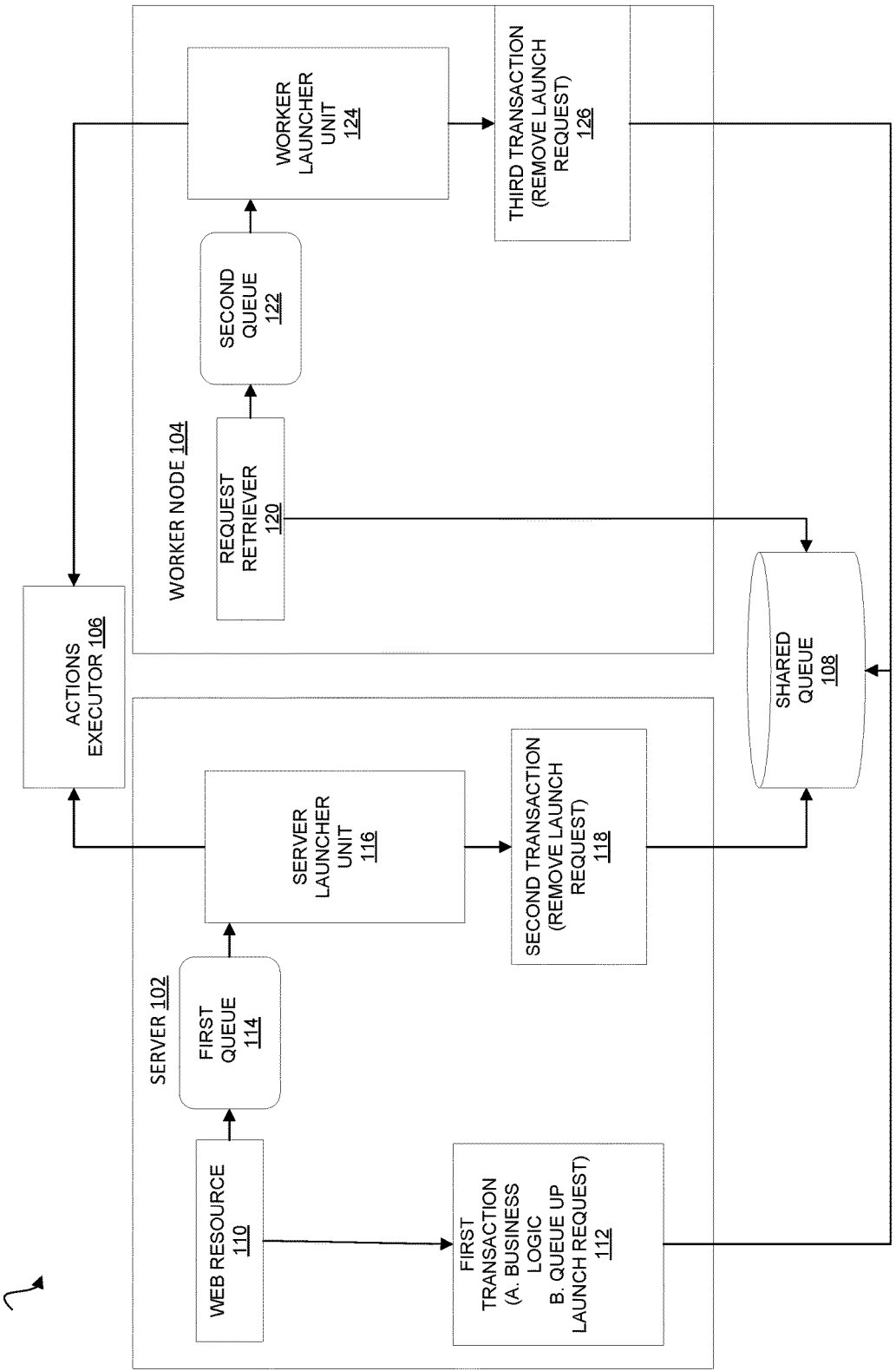
FIG. 1 is a block diagram of a system for a direct launch of asynchronous actions, according to one or more embodiments.

In the following description, various examples will be described. For the purposes of explanation, specific configurations and details are set forth to provide a thorough understanding of the examples. However, it will also be apparent to one skilled in the art that the examples may be practiced without the specific details. Furthermore, well-known features may be omitted or simplified in order not to obscure the example being described.

A cloud computing system can implement a job scheduling protocol to manage the system's workflow requests. In a conventional multi-tenant cloud computing system, each tenant can transmit a workflow request to the service provider. A job launcher can transmit the request to an application layer, where a virtual machine (VM) instance can process the request and return a result to the requestor. In many instances, there is a noticeable latency between the request being transmitted and the request being executed at the application layer. This latency can be especially noticeable for tenant-facing workflows. For example, the conventional method can lead to a four to five second delay before being executed in the application layer.

In addition to latency, the conventional job scheduling protocols permit collisions to occur between job launchers that compete to process the job requests rather than implement protocols to avoid collisions. This is due to the latency introduced by collisions being less than the latency introduced by implementing a protocol to avoid collisions. In other words, the delay caused by a collision is less than a delay a job scheduler would need to avoid the collision.

The herein described embodiments address the above references issues through a job scheduling system that implements an optimistic path for a workflow request that works asynchronously from a pessimistic path for a workflow request. The job scheduling system can receive a stream of incoming workflow requests from the customers of the cloud computing system. A first workflow request can follow an optimistic path from a web resource to a first launcher. The first launcher can receive a workflow request from a tenant and attempt to transmit the request to a workflow service to process the request. The transmission can be successful or unsuccessful. The time required to follow the optimistic path from receiving the request to successfully transmitting the request can be less than the above-described latency of the conventional job scheduler system. However, with the optimistic path, there is no guarantee that the transmission will be successful. Workflow requests that are unsuccessfully transmitted into the workflow service can be loaded onto a queue shared with the pessimistic path.

The workflow request can also follow a pessimistic path from the shared queue to a second launcher. The computing elements of the pessimistic path can retrieve a workflow request from the shared queue and then use a second launcher to transmit the request to the workflow service. Unlike the optimistic path, a workflow request that is unsuccessfully transmitted to the workflow service continues to loop through the pessimistic path until it is successfully transmitted to the workflow service. The elements of the optimistic path work asynchronously from the elements of the pessimistic path without additional latency being introduced in a job scheduling system.

FIG. 1 is a block diagram of a system 100 for a direct launch of actions, according to one or more embodiments. As illustrated, the system 100 includes a server 102 and a worker node 104 that share an actions executor 106 and a shared queue 108. The server 102 can provide an optimistic path for a user to transmit a workflow request through to reach a workflow service to execute the workflow and satisfy the request. For example, a user can use a computing device (e.g., laptop, smartphone, personal computer) to access an online application operating on a server. The user can further initiate a workflow request via the computing device, and the server can transmit the workflow request through the optimistic path to a workflow service that can execute the workflow request. If the server 102 is unable to launch the workflow request through the optimistic path, a worker node 104 can transmit the workflow request through the pessimistic path.

A web resource 110 can receive a workflow request from an application. The web resource 110 can use an application programing interface (API) for enabling communication between the application and the server 102. The web resource 110 can receive workflow requests from multiple applications and can perform actions such that one action associated with one application does not interfere with another action associated with another application.

The web resource 110 can transmit instructions via a first transaction 112 (e.g., API transaction). The first transaction 112 can record the rules and commands of the business logic of the workflow request. The first transaction 112 can further include instructions for queuing up a duplicate of the workflow transmission request into the shared queue 108. The instructions can include instructions for creating a virtual machine (VM) instance, if needed. These instructions can be formatted for communicating with the shared queue 108. The first transaction 112 can further include instructions for creating an event associated with the workflow request, including generating an event identifier and associating the identifier with the workflow request. The transmission request can further include instructions for a service, including a set of steps to be performed to execute the workflow request.

The workflow request information, the business logic, and the transmission request information can be loaded onto the shared queue 108. The shared queue 108 can include a database that includes a queue configured to accept messages that are transmitted in conjunction with a transaction. The shared queue 108 can be a data structure that can receive elements and one end of the queue (e.g., workflow request information, the business logic and the launch request information), order the elements in a sequence, and release the elements from the other end of the queue, such as to the worker node 104.

The web resource 110 can further load information associated with the workflow request (e.g., first workflow information) onto a first queue 114. In some embodiments, the web resource 110 can load the information associated with the workflow request onto the first queue 114 after execution of the first transaction 112. The information can be, for example, a duplicate of the workflow request with instructions to retrieve a data, transform the data, and/or return the data to the web resource 110. The first queue 114 can be an in-memory queue in main memory that holds instances of information related to different workflow requests. The first queue 114 can be, for example, a Java queue, which can be a data structure that can receive elements and one end of the queue (e.g., information instances associated with workflow requests), order the elements in a sequence, and release the elements from the other end of the queue to a launcher.

The server launcher unit 116 can be a backend process that can transmit a workflow request from the first queue 114 to the actions executor 106 (e.g., workflow service). The server launcher unit 116 can monitor the workflow requests stored in the first queue 114 and launch workflows based on various parameters, such as a position of the workflow request in the queue, available resources for executing a workflow, and status of a workflow service such as an actions executor 106. The actions executor 106 can route the workflow request instance to a service for executing the workflow request, which can include a library of re-usable workflows for executing the workflow request.

The second transaction 118 can include instruction to identify a duplicate of the workflow request stored in the shared queue 108 (e.g., transactional queue). These instructions can be formatted for communicating with the shared queue 108. The second transaction 118 can further include instructions to update the shared queue 108. For example, the shared queue 108 can be updated by deleting the duplicate of a workflow request that has successfully been transmitted to the actions executor 106. A workflow request can be successfully transmitted if the actions executor 106 can initialize a workflow to satisfy the request.

The server 102 can include one or more interconnected servers, in which each server can manage one or more worker nodes 104 implementing one or more cloud computing applications or services. For example, the server 102 can store and provide access to database data (e.g., via a workflow request). The worker node 104 included in the server 102 can be located in one or more data center environments. The server 102 can use an application programming interface (API) compute control plane that can implement an optimistic path.

The worker node 104 can include a compute worker control plane that can implement a pessimistic path. The worker node 104 can be a part of a set of worker nodes that can each host containerized applications, such as for executing a pessimistic path, which are managed using the API compute worker control plane. Unlike the server 102, the worker node 104 can implement a pessimistic path and can guarantee that a workflow request can be transmitted to the actions executor 106.

The worker node 104 can include a request retriever 120 that can monitor the shared queue 108 to determine whether to retrieve a workflow request. The request retriever 120 can monitor each workflow request stored in the shared queue 108 and determine an amount of time that has elapsed since the workflow request was received by the web resource 110. For example, the request retriever 120 can monitor a time stamp associated with workflow request, and compare the time elapsed with a threshold time. If the time elapsed exceeds the threshold, then the request retriever 120 can retrieve the workflow request. If, however, the time elapsed does not exceed the threshold, the request retriever 120 can leave the workflow request in the shared queue 1068 and move onto to a next workflow request. The threshold time provides the server 102 to launch the workflow request into the actions executor 106. Once the threshold time has expired, the worker node can be free to launch the workflow request into the actions executor 106. The threshold time can be based a project time that a workflow request is retrieved by the request retriever and transmitted to the actions executor 106. This provides the optimistic path enough time to attempt to transmit a workflow request, and remove the request from the shared queue 108, if successful.

If the request retriever 120 retrieves a workflow request from the shared queue 108, the retriever can load the workflow request into the second queue 122 (e.g., an in-memory queue). The second queue 122 can be, for example, a Java queue, which can be a data structure that can receive elements and one end of the queue (e.g., information instances associated with workflow requests), order the elements in a sequence, and release the elements from the other end of the queue to a launcher.

The worker launcher unit 124 can be a backend process that can transmit a workflow based on a request stored in the second queue 122. The worker launcher unit 124 can monitor the workflow requests stored in the second queue 122 and launch workflows based on various parameters, such as a position of the workflow request in the queue, available resources for executing a workflow, and status of a workflow service such as an actions executor 106. The worker launcher unit 124 can further route the instance to a service for executing the workflow, such as the actions executor 106.

The worker launcher can further transmit instructions via a third transaction 126 (e.g., API transaction). The third transaction 126 can include information to identify a copy of the workflow request stored in the shared queue 108. These instructions can be formatted for communicating with the shared queue 108. The third transaction 126 can further include instructions to update the shared queue 108. For example, the shared queue 108 can be updated by deleting the copy of a workflow request, which is successfully transmitted to the actions executor.

Figure 2:
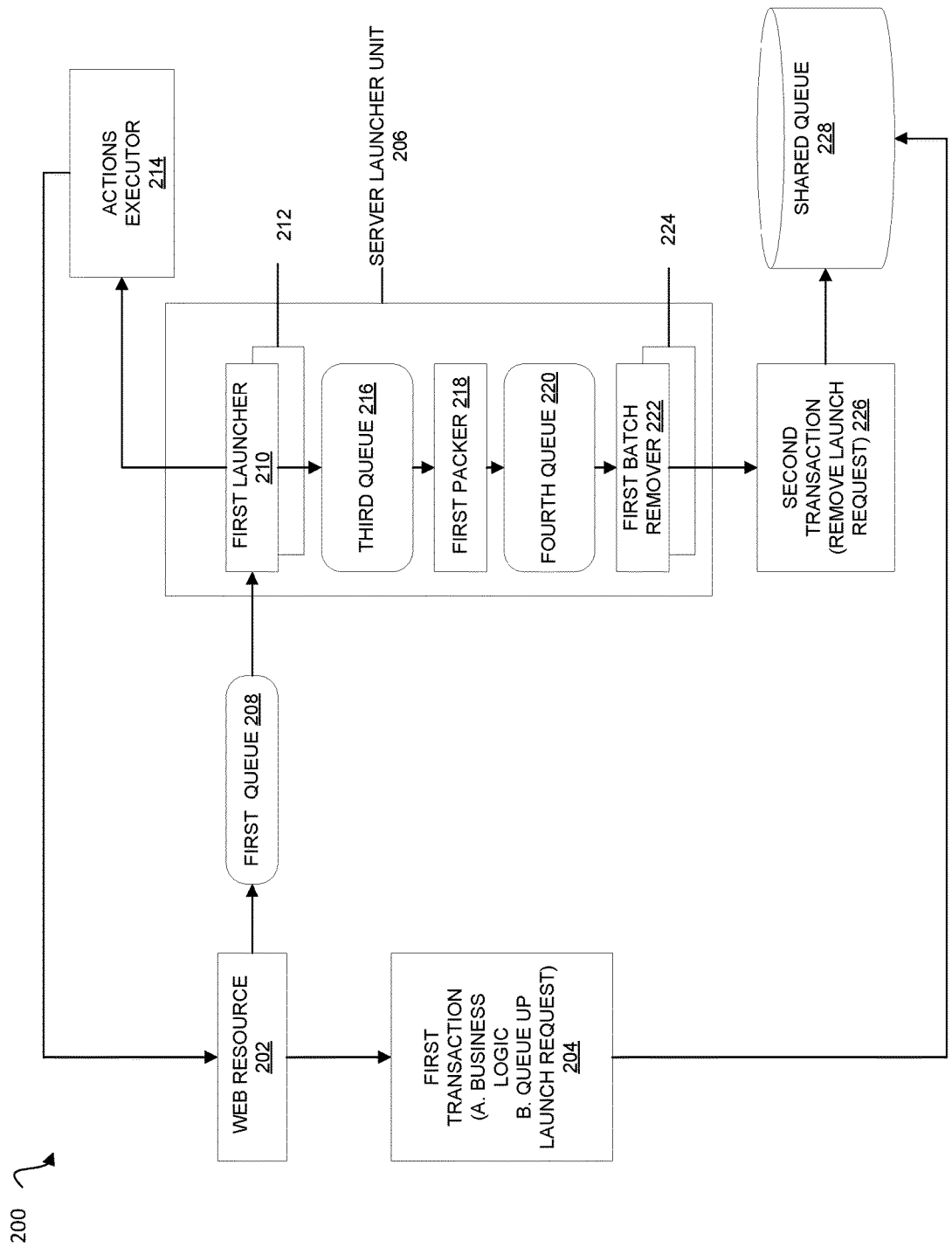
FIG. 2 is a block diagram of an optimistic path for a direct launch of asynchronous actions, according to one or more embodiments.

FIG. 2 is a block diagram of an optimistic path 200 for a direct launch of actions, according to one or more embodiments. The optimistic path 200 can be executed by a server, such as server 102 of FIG. 1. The optimistic path 200 can include a web resource 202. The web resource 202 can be the same web resource 110 of FIG. 1. The web resource 110 can transmit instructions via a first transaction 204 to the shared queue 228. This action can be performed by the web resource 202 in parallel with loading workflow requests onto the first queue 208. The first transaction 204 can be the same as the first transaction 112 of FIG. 1. This first transaction 204 can include the rules and commands of the business logic set by a cloud services provider (CSP). The first transaction 204 can further include instructions for queuing up a launch request, which can include writing instructions for creating a virtual machine (VM) instance, if needed. These instructions can be formatted for communicating with the shared queue 228. The first transaction 204 can further include instructions for creating an event associated with the workflow request, including generating an event identifier and associating the identifier with the workflow request. The launch request can further include instructions for a service including, a set of steps to be performed to execute the workflow request.

The web resource 202 can receive workflow requests from multiple applications and load information associated with a workflow request (e.g., first workflow information) onto a first queue 208. The first queue 208 can be the same as the first queue 114 of FIG. 1. In some embodiments, the first queue 208 receives the from the web resource after the execution of the first transaction 204.

A server launcher unit 206 can retrieve a workflow request from the first queue 208. The server launcher unit 206 can be the same as the server launcher unit 116 of FIG. 1. The server launcher unit 206 can include first launcher 210 and a second launcher 212. Each launcher can be in operable communication with the first queue 208. Furthermore, each launcher can retrieve a workflow request from the first queue 208. Each launcher can transmit a workflow request from the first queue 208 to an asynchronous second launcher 214. The asynchronous second launcher 214 can be the same asynchronous actions executor 106 of FIG. 1. Each launcher can monitor the workflow requests stored in the first queue 208 and launch workflows based on various parameters, such as a position of the workflow request in the queue, available resources for executing a workflow, and the status of a workflow service such as a second launcher 214. It should be appreciated that although two launchers are illustrated, the server launcher unit 206 can include any number of launchers to implement the functionality described herein. In some embodiments, a server can monitor real-time performance metrics of the optimistic path 200 and can add or remove launcher instances in real-time based on the metrics.

The first launcher 210 and the second launcher 212 can continuously launch workflow requests retrieved from the first queue 208. In some instances, a launch can be successful, or in other words, an actions executor can receive the workflow request and pair the request with a workflow to execute the request. In other instances, the launch can be unsuccessful, or in other words, or in other words, the actions executor can receive the workflow request and is unable to pair the request with a workflow to execute the request. Regardless of whether the launcher is successful or unsuccessful, after the launch attempt, the launcher can move on to a next workflow request in the first queue 208.

In the event that the launcher (e.g., first launcher 210 and the second launcher 212) is successful, the launcher can transmit a first data to a third queue 216. The queue is described as a third queue 216 so as to not be confused with the second queue 122 of FIG. 1. The third queue 216 can be in operable communication with the first launcher 210 and the second launcher 212. The third queue 216 can receive data from either launcher. The data can include an identity of a workflow request that successfully transmitted to the actions executor. For example, each workflow request can be associated with a workflow identifier (ID). The data can include additional information, such as a duplicate of the workflow request, and be in the form of a file The server launcher unit 206 can further include a first packer 218. The first packer 218 (e.g., runtime packer) can be software operable to compress workflow data instances into a batch. The data can later be decompressed using the appropriate decompression algorithm. For example, a batch can be decompressed by a batch remover. In some embodiments, the server launcher unit 206 can include a single packer to avoid contention events at the third queue 216. Compressing the workflow data instances into a batch can enable a queue to hold more workflow data instances, than if the data were not compressed.

As described above, the optimistic path 200 can attempt to launch a workflow request within a threshold period of time, and once that threshold has passed, a pessimistic path can attempt to launch the workflow request if the optimistic path 200 was unsuccessful. Therefore, the first packer 218 can be configured to pack data from the third queue 216 to keep the time of the flow of data through the server launcher unit 206 as low as possible. For example, the first packer 218 can pack together instances of data associated with successful workflow request launches based on a threshold number of workflow request launches. Therefore, the first packer 218 can receive instances of data related to successful workflow request launches until the threshold number of instances is reached. Once the threshold number of instances is reached, the first packer 218 can compress the instances together into a batch of instances. For example, if the threshold number of instances is ten instances, the first packer 218 can continue to receive instances, until the number of instances reaches ten. Once the number of instances reaches ten, the first packer 218 can compress the instances into a batch. In addition to monitoring the number of instances, the first packer 218 can monitor the size of each instance to keep the compression time down to a minimum. The first packer 218 can monitor the size of each incoming instance. The packer 214 can further add the size of each instance and compare the aggregate size to a threshold aggregate size value. Once the aggregate size exceeds the threshold aggregate size, the first packer 218 can compress the instances to generate a batch. In some embodiments, the threshold aggregate size can override the threshold number of instances. For example, if the number of instances has not reached the threshold number of instances. However, the aggregate size of the instances has exceeded the threshold aggregate size, the first packer 218 can compress the instances regardless of not reaching the threshold number of instances. In other embodiments, the threshold number of instances can override the threshold aggregate size. For example, if the aggregate size of the instances has exceeded the threshold aggregate size, however, the number of instances has not exceeded the threshold number of instances, the first packer 218 can continue to receive instances until the threshold number of instances is exceeded.

The server launcher unit 206 can further include a fourth queue 220 (e.g., in-memory queue). The fourth queue 220 can be in operable communication with the first packer 218. The packer 214 can transmit batches to the fourth queue 220, and the fourth queue 220 can hold the batches.

The server launcher unit 206 can further include a first batch remover 222 and a second batch remover 220. Each of the batch removers can continuously receive batches from the fourth queue 220. It should be appreciated that although FIG. 2 illustrates two batch removers, the server launcher unit 206 can include any number of batch removers to implement the functionality described herein. As described above, the server can monitor real-time performance metrics and adjust the number of batch removers in real-time based on the metrics. Once a batch is received, a batch remover (e.g., first batch remover 222 or second batch remover 224) can identify the workflow requests included in the batch. The number of workflow requests in a batch can vary based on the manner by which the packer 214 packs the workflow requests. For example, the packer 214 can implement a threshold number of instances, an aggregate size threshold, or a combination thereof. The batch remover can identify the workflow requests in a batch, for example, by reading a workflow requests identifier. The batch remover can further generate a second transaction 226. The second transaction 226 can be the same as the second transaction 118 of FIG. 1. The second transaction 226 can include instructions to update the shared queue 228. The shared queue 228 can be the same as the shared queue 108 of FIG. 1. The second transaction 226 can include instructions to update the shared queue 228, including deleting the workflow requests included in the batch, or marking the workflow requests as successful launches, or otherwise marking workflow requests to cause a pessimistic path to ignore the requests.

Figure 3:
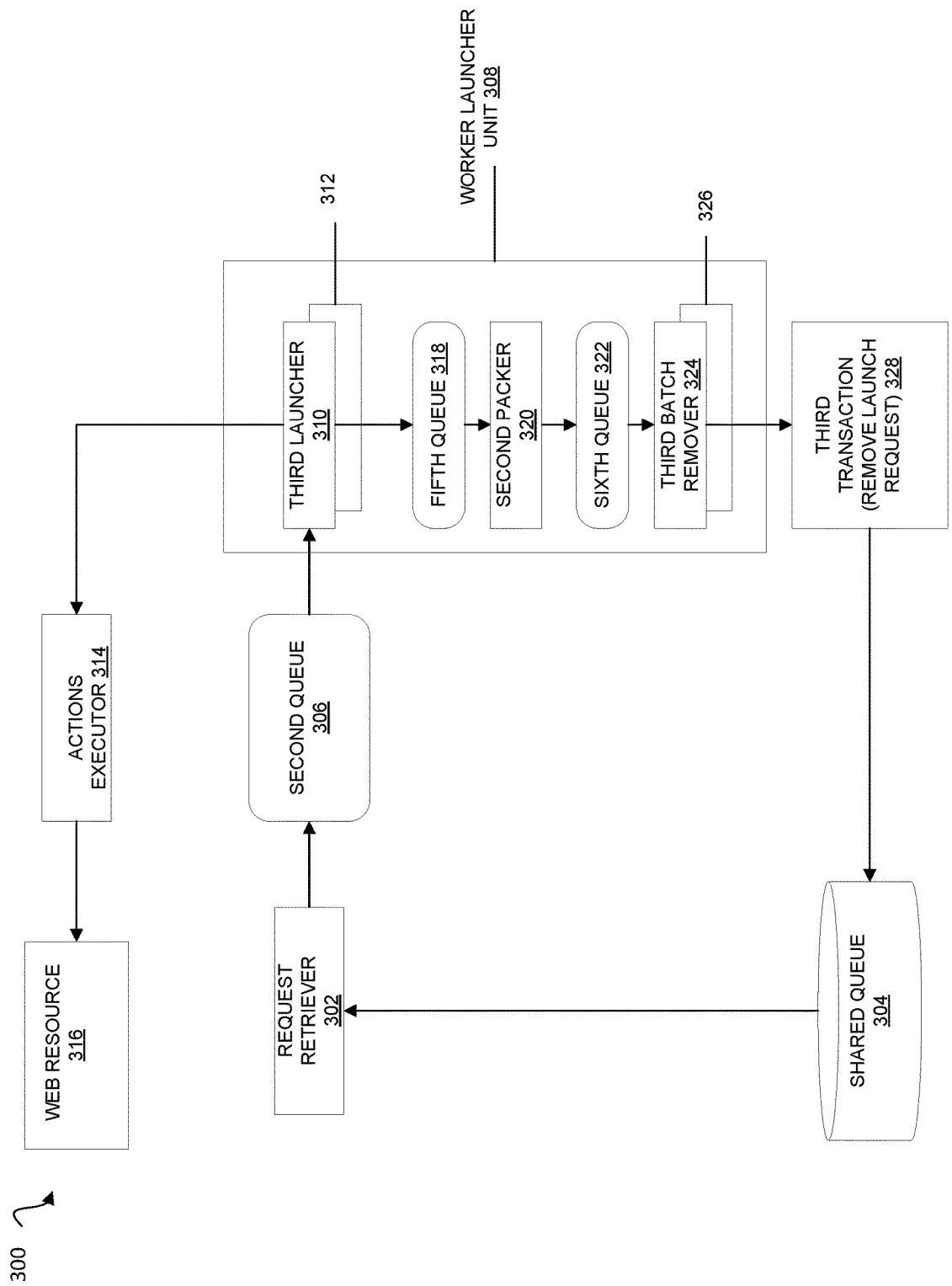
FIG. 3 is a block diagram of a pessimistic path for a direct launch of asynchronous actions, according to one or more embodiments.

FIG. 3 is a block diagram of a pessimistic path 300 for a direct launch of actions, according to one or more embodiments. The pessimistic path 300 can differ from the optimistic path 200 in that the optimistic path 200 can make a single attempt to transmit a workflow request into an actions executor. If the optimistic path 200 is successful, the workflow request can be transmitted to the actions executor and a copy of the workflow request can be removed from the transaction queue. This can prevent the pessimistic path 300 from recovering the workflow request from the shared queue and attempting to transmit the same workflow request. If, however, the optimistic path fails, the optimistic path simply moves one to the next workflow requests and leaves a duplicate of the workflow request in the shared queue.

On the other hand, the pessimistic path 300 can continue to attempt to transmit a workflow request until the launch is successful. The pessimistic path 300 can wait to allow a workflow request to remain in the shared queue for a threshold amount of time. The threshold amount of time can allow the optimistic path 200 to attempt to transmit the workflow request, and, if successful, remove the workflow request from the transaction queue. Once the workflow request has remained in the shared queue for the threshold about of time, the pessimistic path can retrieve the workflow request and attempt to launch the request. If the pessimistic path 300 is successful at launching the workflow request, the request can be removed from the shared queue. If the pessimistic path 300 is unsuccessful, the workflow request can remain in the shared queue to be retried for a launch via the pessimistic path 300.

A request retriever 302 can retrieve a workflow request from a shared queue 304. The shared queue 304 can be the same as the shared queue 108 of FIG. 1 or the shared queue 228 of FIG. 2. The request retriever 302 can retrieve the workflow request based on a time elapsed from when the workflow request was loaded onto the shared queue 304. For example, each workflow request in the shared queue 304 can include a time stamp. The request retriever 302 can read the time stamp and calculate a time elapsed since the time stamp of the workflow request. If the time elapsed is greater than a threshold time, the request retriever 302 can retrieve the workflow request. If, however, the elapsed has not exceeded the threshold time, the request retriever 302 can allow the workflow request to remain in the shared queue 304 and move on to the next workflow request. If the request retriever 302 retrieves a workflow request from the shared queue, the request retriever can load the workflow request onto a second queue 306. The second queue 306 can be the same as the second queue 122 of FIG. 1.

The worker launcher unit 308 can include a third launcher 310 and a fourth launcher 312. The worker launcher unit 308 can be the same as the worker launcher unit 124 of FIG. 1. Each launcher can be in operable communication with the second queue 306. Furthermore, each launcher can retrieve a workflow request from the second queue 306. Each launcher can further transmit a workflow request to an actions executor 314. The asynchronous actions executor 314 can be the same as the actions executor 106 of FIG. 1 or the asynchronous actions executor 106 of FIG. 1. It should be appreciated that although two launchers are illustrated, the worker launcher unit 308 can include any number of launchers to implement the functionality described herein.

The third launcher 310 and the fourth launcher 312 can continuously transmit workflow requests retrieved from the second queue 306 to the actions executor 304. In some instances, a launch can be successful, or in other words, the asynchronous actions executor 314 can receive the workflow request and pair the request with a workflow to execute the request. In other instances, the launch can be unsuccessful, or in other words, or in other words, the actions executor 314 can receive the workflow request and is unable to pair the request with a workflow to execute the request. The pessimistic path 300 can differ from the optimistic path 200 on what follows. As described above, the optimistic path 200 can make a single attempt per workflow request to transmit the request. Regardless of whether the optimistic path launcher was successful, the optimistic path launcher can be configured to not to reattempt to transmit a workflow request into the actions executor. On the other hand, as explained below, even if the third launcher 310 or the fourth launcher 312 are unsuccessful, the workflow request can remain in a loop of the pessimistic path 300 to enable either launcher to reattempt to transmit the request to the actions executor 314.

In the event that the launcher (e.g., third launcher 310 and the fourth launcher 312) is successful, at transmitting the workflow request to the actions executor 314, the asynchronous actions executor 314 can pair the request with a workflow to process the request. The actions executor 314 can further receive a response and transmit the response the web resource 316, which can initiate an action based on the response. For example, the workflow request can be to authenticate a password. The actions executor 314 can receive the authentication request, assign a workflow to authenticate the password, and provide a response to the web resource 316.

In addition to transmitting the workflow request, a launcher (e.g., third launcher 310 or fourth launcher 312) can transmit data to a fifth queue 318. The fifth queue 318 can be in operable communication with the third launcher 310 and the fourth launcher 312 and can receive data from either launcher. The data can include an identity of a workflow request that was successfully transmitted to the actions executor 314. The data can include additional information, such as a duplicate of the workflow request.

The worker launcher unit 308 can further include a second packer 320. The second packer 320 can be software operable to compress the data together with other instances of successful workflow request transmissions into a batch. The batch can later use the appropriate decompression algorithm. The second packer 320 can be configured to pack instances of data associated with successful workflow request launches. For example, the second packer 320 can pack together instances of data associated with successful workflow request launches based on a threshold number of workflow request launches. In addition to monitoring the number of instances, the second packer 320 can monitor the size of each instance. To keep the compression time down to a minimum, the second packer 320 can further be configured with a threshold aggregate instance size. The worker launcher unit 308 can further include a fourth queue 220. The fourth queue 264 can be in operable communication with the second packer 320. The packer 214 can transmit batches to the sixth queue 322, and the sixth queue 322 can hold the batches.

The worker launcher unit 308 can further include a third batch remover 324 and a fourth batch remover 326. Each of the batch removers can continuously receive batches from the sixth queue 322. It should be appreciated that although FIG. 3 illustrates two batch removers, the server launcher unit 206 can include any number of batch removers to implement the functionality described herein. In fact, the number of batch removers is not necessarily static. A worker node can monitor real-time performance statistics and either generate new batch remover instances or remove batch remover instances based on the statistics. Once a batch is received, the batch remover (e.g., third batch remover 324 or fourth batch remover 326) can identify the workflow requests included in the batch. The number of workflow requests in a batch can vary based on a manner by which the first packer 218 packs the workflow requests. For example, the second packer 320 can implement a threshold number of instances, an aggregate size threshold, or a combination thereof. The batch remover can identify the workflow requests in a batch, for example, by reading a workflow requests identifier.

The batch remover can further generate a third transaction 328. The third transaction can be the same as the third transaction 126 of FIG. 1. The third transaction 328 can include instructions to update the shared queue 304. The shared queue 304 can be the same as the shared queue 108 of FIG. 1 or the shared queue 228 of FIG. 2. The third transaction 328 can include instructions to update the shared queue 304, including deleting the workflow requests included in the batch, or marking the workflow requests as successful launches, or marking workflow requests to cause a pessimistic path to ignore the request.

The workflow data instances that are stored on the shared queue 304 can remain in the queue until either the server launcher unit 206 or the worker launcher unit 308 successfully transmit the workflow request to the actions executor 314. In some embodiments, the server launcher unit 206 can only make a single attempt to transmit a workflow request to the actions executor 314. This can be due to the optimistic path 200 being configured to launch workflow requests within a projected latency period of the pessimistic path 300. The optimistic path 200 can attempt to successfully launch a workflow request during a latency window between the workflow data instance being loaded onto the shared queue, and the third launcher 310 or fourth launcher 312 being in a position to transmit the workflow request to the actions executor 314. Rather than speed, the pessimistic path 30 can be concerned with ensuring that the customer's workflow request is successfully transmitted to the actions executor 314. Therefore, a workflow request that did not successfully get transmitted to the actions executor 314 can remain in the pessimistic path 300 for a launcher to reattempt to transmit the workflow request to the actions executor 314.

The third launcher 310 and the fourth launcher 312 can continuously transmit workflow requests to the actions executor 314. In some instances, both launchers can attempt to transmit a respective workflow request at the same time, and this can cause a collision. If this occurs, both transmissions can be discarded, and each transmission is unsuccessful. Conventional workflow request launcher systems allow collisions to occur because the time required to resolve the collision is longer than allowing the collision and retransmitting. The herein described embodiments, introduce the concept of the optimistic path 200, and therefore the optimistic path can continuously transmit workflow request to the actions executor 314 as the pessimistic path resolves collisions. The pessimistic path 300 can adopt various techniques to resolve collisions between the third launcher 310 and the fourth launcher 312. For example, one collision avoidance technique is using a leader election algorithm. For leader election, either the third launcher 310 or the fourth launcher can be elected as a leader launcher. The leader election algorithm can allow the launchers to present their own individual characteristics and elect a leader based on those characteristics. Therefore, if the first launcher 310 is elected leader, then a transmission by the first launcher 310 to the actions executor 314 can take priority over a transmission by the fourth launcher 312 to the actions executor 314. Using the priority, the third launcher 310 can choose to allow its own transmission and throttle a collision inducing transmission of the fourth launcher 312. Another technique that can be employed is partitioning using multiple leader elections. In some instance, the number of launcher instances is large enough to partition the launchers into different groups. In other instances, the different characteristics of the launchers can lead to the organization of the launchers through a partition process. In either instance, each partition of launchers can apply an election algorithm to elect a leader launcher for the partition. For the optimistic path 200, a launcher can make a single attempt to launch a workflow request. The launcher attempt can cause a collision with another launcher. However, as the optimistic can be configured for a single attempt, a collision simply results in an unsuccessful attempt, and there is no reason for a collision avoidance mechanism for the optimistic path 200.

Figure 4:
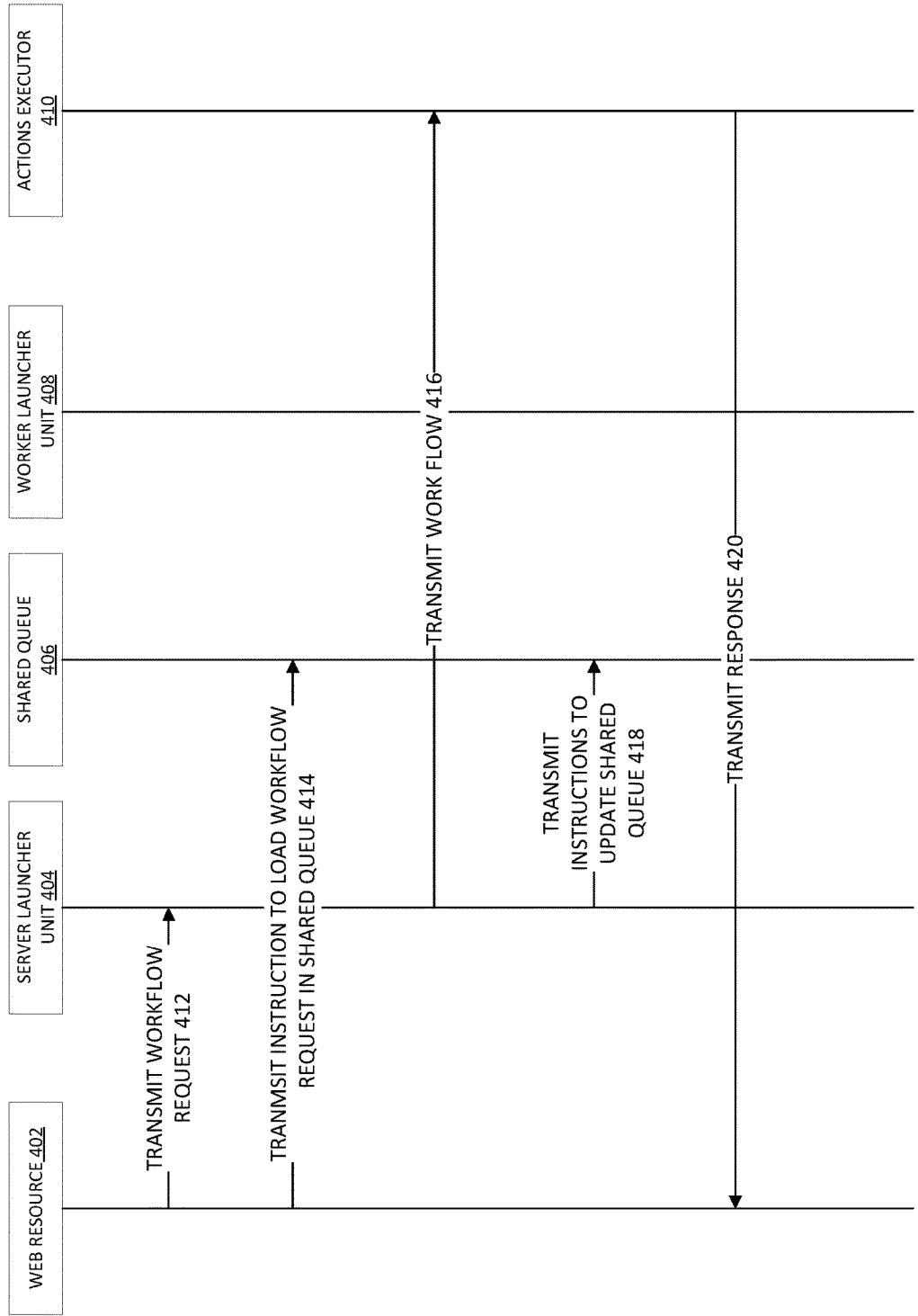
FIG. 4 is a signaling diagram for a direct launch of asynchronous actions, according to one or more embodiments.

FIG. 4 is a signaling diagram flow 400 for a direct launch of asynchronous actions, according to one or more embodiments. As illustrated, a web resource 402 can be in operable communication with a server launcher unit 404, a shared queued 406, a worker launcher unit 408, and an actions executor 410. While the operations of processes 400, 500, 600, and 700 are described as being performed by generic computers, it should be understood that any suitable device (e.g., a user device, a server device) may be used to perform one or more operations of these processes. Processes 400, 500, 600, and 700 (described below) are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform functions or implement data types. The order in which the operations are described is not intended to be construed as a limitation, and any number of the described operations can be combined in any order and/or in parallel to implement the processes.

At 412, a web resource 402 can transmit a workflow request to a server launcher unit 404. The workflow request can be a request initiated by a user or an application to add, modify, or delete data. The request may require a workflow, such as a pre-encoded workflow of a workflow service to be satisfied.

At 414, the web resource 402 can further transmit instructions to load the workflow request in a shared queue 414. The instructions can be in the form of a transaction, such as an API transaction. The instructions can further include a duplicate of the workflow instructions, or in other words, a data associated with the workflow request. In response to receiving the instructions, the shared queue 406 can load the workflow request onto itself.

At 416, the server launcher unit 404 can transmit the workflow request to an actions executor 410. The actions executor 410 can be a workflow service for satisfying workflow requests. The transmission from the server launcher unit 404 to the actions executor can be a successful transmission or an unsuccessful transmission. The transmission can be a successful transmission if the action executor 410 initiates a workflow to satisfy the request. The transmission can be unsuccessful transmission if the action executor 410 does initiate a workflow to satisfy the request. If the transmission is successful, the process can move to step 416. If the transmission is unsuccessful, the process can move to step 512 of FIG. 5.

At step 418, the server launcher unit 404 can transmit instructions to update the shared queue to the shared queue 406. In response, the shared queue 406 can update the queue. For example, the shared queue can delete the workflow request. At 420, the actions executor 410, upon successful processing of the workflow request can transmit a response to the web resource.

Figure 5:
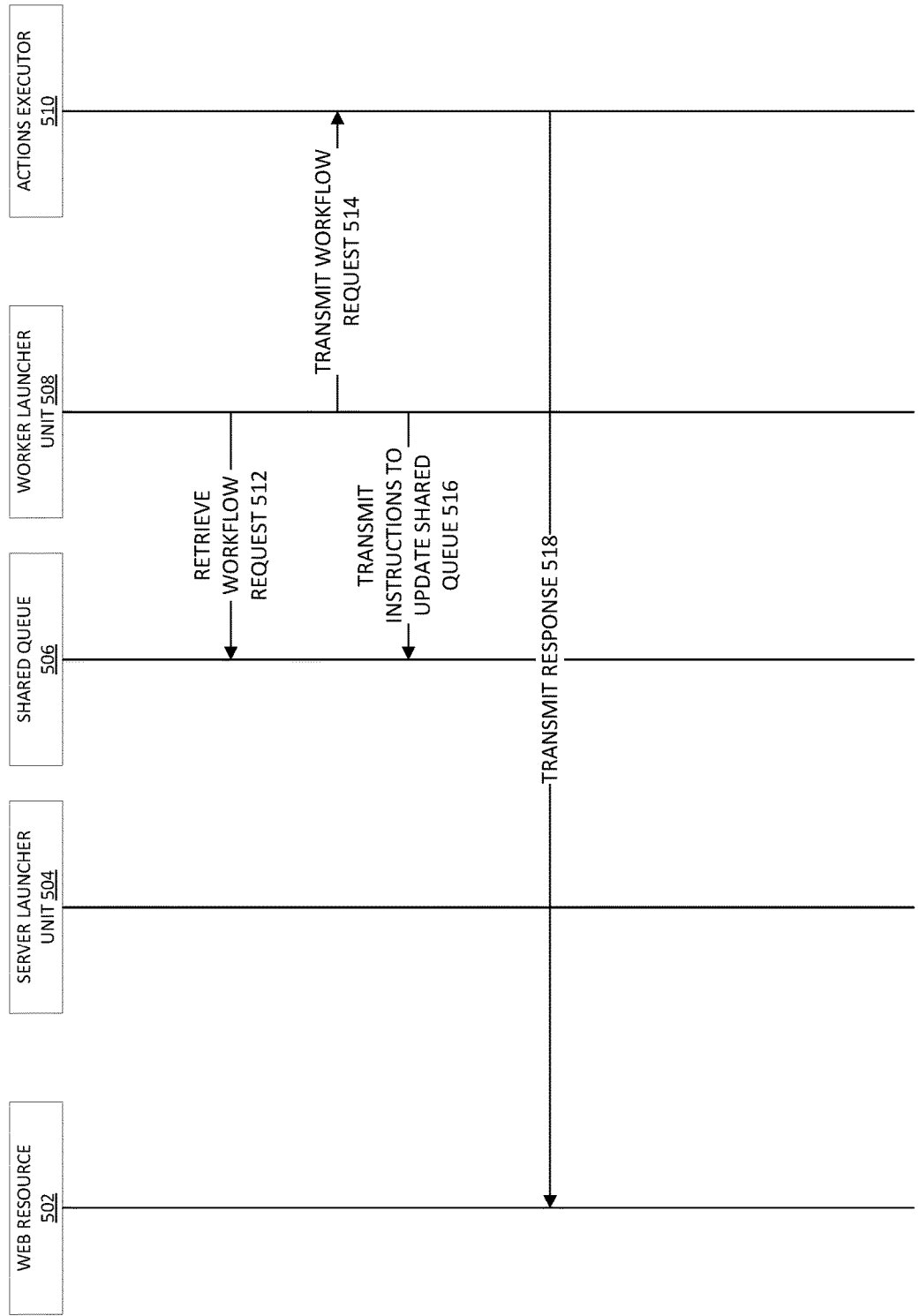
FIG. 5 is a signaling diagram for a direct launch of asynchronous actions, according to one or more embodiments.

FIG. 5 is a signaling diagram flow 500 for a direct launch of asynchronous actions, according to one or more embodiments. As illustrated, a web resource 502 can be in operable communication with a server launcher unit 504, a shared queued 506, a worker launcher unit 508, and an actions executor 510.

At 512, the worker launcher unit 508 can retrieve the workflow request (e.g., workflow request of step 412) from the shared queue 506. In some embodiments, the worker launcher queue 508 can determine a time that has elapsed since the workflow request was loaded onto the shared queue (see, for example, step 418). If the worker launcher unit 508 determines that the workflow request has remained in the shared queue 506 for longer than a threshold time, the workflow request can be retrieved. If, however, the worker launcher unit 508 determines that the workflow request has remained in the shared queue 506 for less than a threshold time, the workflow can be passed over for another workflow request.

At 514, the worker launcher unit 508 can transmit the workflow request 514 to the actions executor 510. It assumed that the elapsed time has exceeded the threshold time.

At 516, the worker launcher unit 508 can transmit instructions to update the shared queue 506 to the shared queue 506. In response, the shared queue 506 can delete the workflow request from the shared queue 506.

At 518, the actions executor 510 can process the workflow request and transmit a response to the web resource 502.

Figure 6:
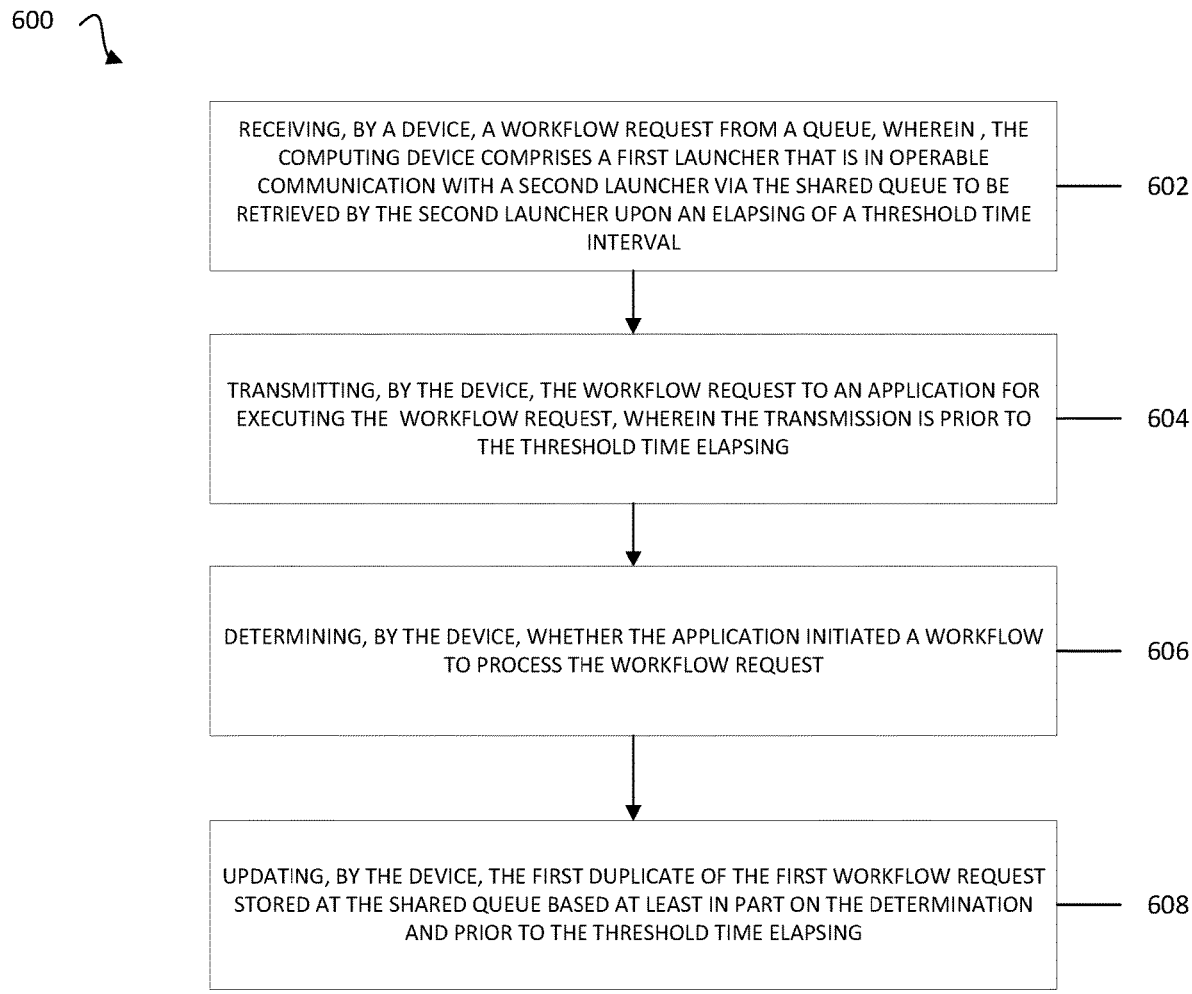
FIG. 6 is a process flow for a direct launch of asynchronous actions, according to one or more embodiments.

FIG. 6 is a process flow 600 for a direct launch of asynchronous actions, according to one or more embodiments. At 602, the method can include a device receiving a workflow request from a queue. The queue can be an in-memory queue configured to receive workflow requests from a web resource. The web resource can further transmit instructions, including a duplicate of the workflow request, and instruction to load the duplicate onto a shared queue. The device can be a server launcher unit that includes a first launcher. The device can be in operable communication with a s that server launcher unit including a second launcher. Each of the first launcher and the second launcher can be in operable communication via the shared queue. For example, if the server launcher unit causes a workflow instance to be removed from the shared queue prior to the elapsing of a threshold time interval, the worker launcher unit can receive the removal information via the shared queue.

At 604, the method can include the device transmitting the workflow request to an application for executing the workflow request. The application can be an actions executor or workflow service that include pre-configured workflows for satisfying the request. The transmission can further be performed prior to threshold time elapsing.

At 606, the method can include the device determining whether application initiated a workflow to process the workflow request. For example, the device can receive a message from the application. The message can include information as to whether the application initiated a workflow or did not initiate a workflow to process the request.

At 608, the device can update the duplicate of the first workflow request stored at the shared queue based on the determination and prior to the threshold time elapsing. The updating can include generating instructions to delete the duplicate of the first workflow request stored at the shared queue.

Figure 7:
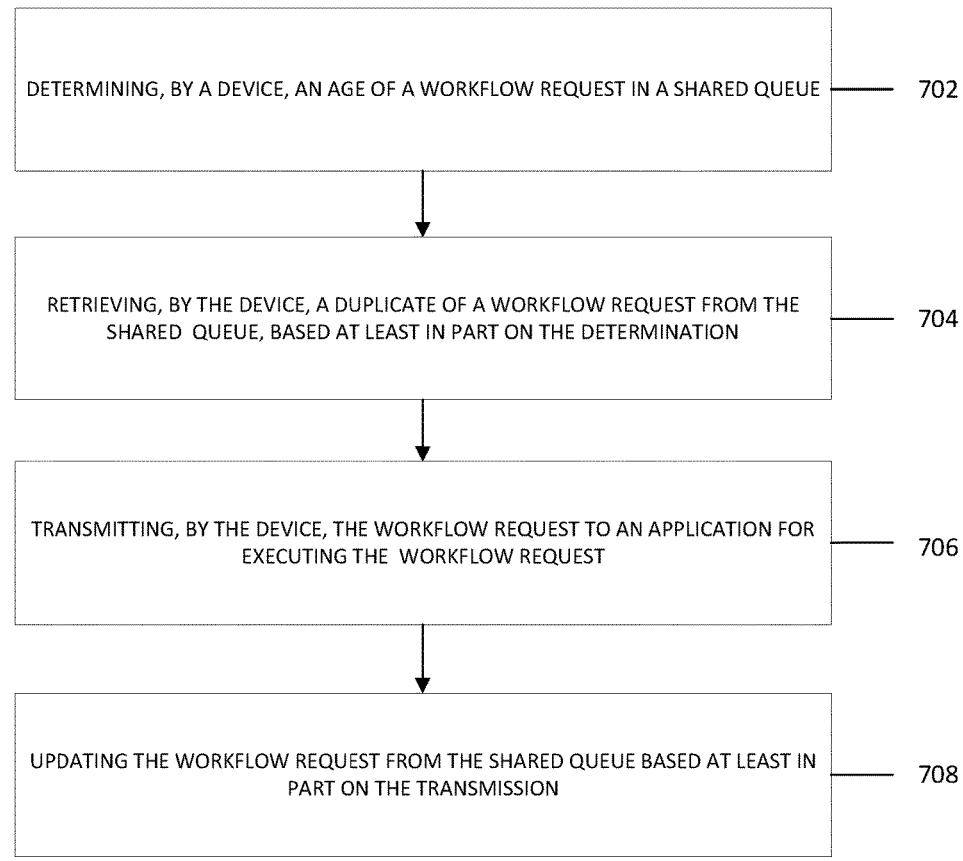
FIG. 7 is a process flow for a direct launch of asynchronous actions, according to one or more embodiments.

FIG. 7 is a process flow 700 for a direct launch of asynchronous actions, according to one or more embodiments. At 702, a method can include a device (e.g., a worker node) determining an age of a workflow request in a shared queue. For example, the device can read a time stamp associated with the workflow request and calculate a time elapsed from the time stamp. The device can further compare the time elapsed to a threshold elapsed time.

At 704, the method can include the device retrieving a duplicate of the workflow request from the shared queue. If the time elapsed exceeds the threshold time, the device can retrieve the workflow request. If, however, the time elapsed does not exceed the threshold time, the device can move on to a next workflow request in the shared queue.

At 707, the method can include transmitting the workflow request to an application for executing the workflow request. The application can be an actions executor or workflow service that includes pre-configured workflows for satisfying the request. The transmission can be successful if the application initiates a workflow to satisfy the request. The transmission can be unsuccessful if the application does not initiate a workflow to satisfy the request.

At 708, the method can include the device updating the workflow request in the shared queue based at least in part on the transmission. If the transmission was successful, the device can update the workflow request by generating instructions to delete it from the shared queue. If, however, the transmission was unsuccessful, the device can allow the workflow request to remain in the shared queue. In this sense, the device can reattempt to transmit the workflow request to the application until it is successful.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 8:
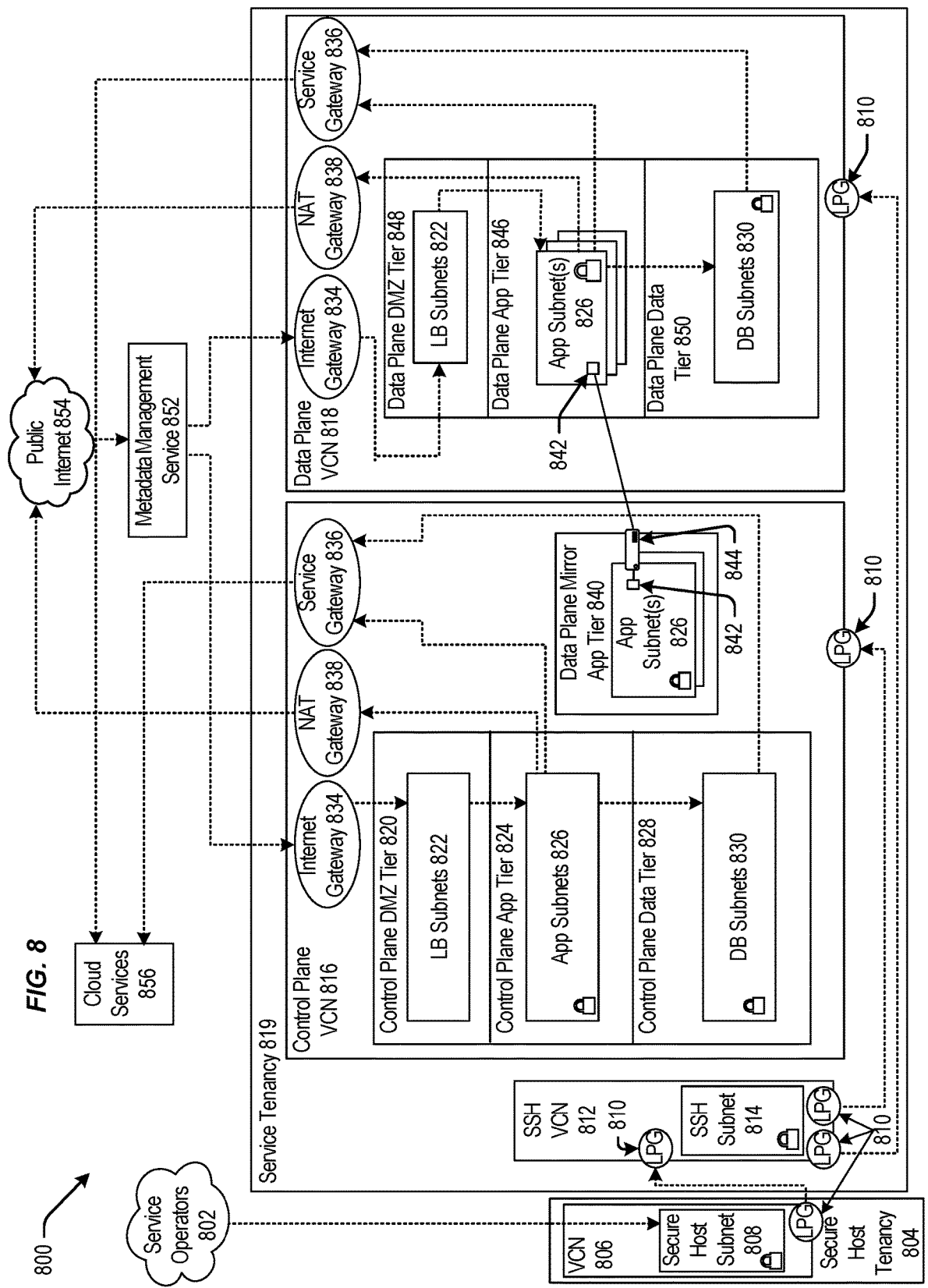
FIG. 8 is a block diagram illustrating one pattern for implementing a cloud infrastructure as a service system, according to one or more embodiments.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively couple to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Metadata that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of threat prevention, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
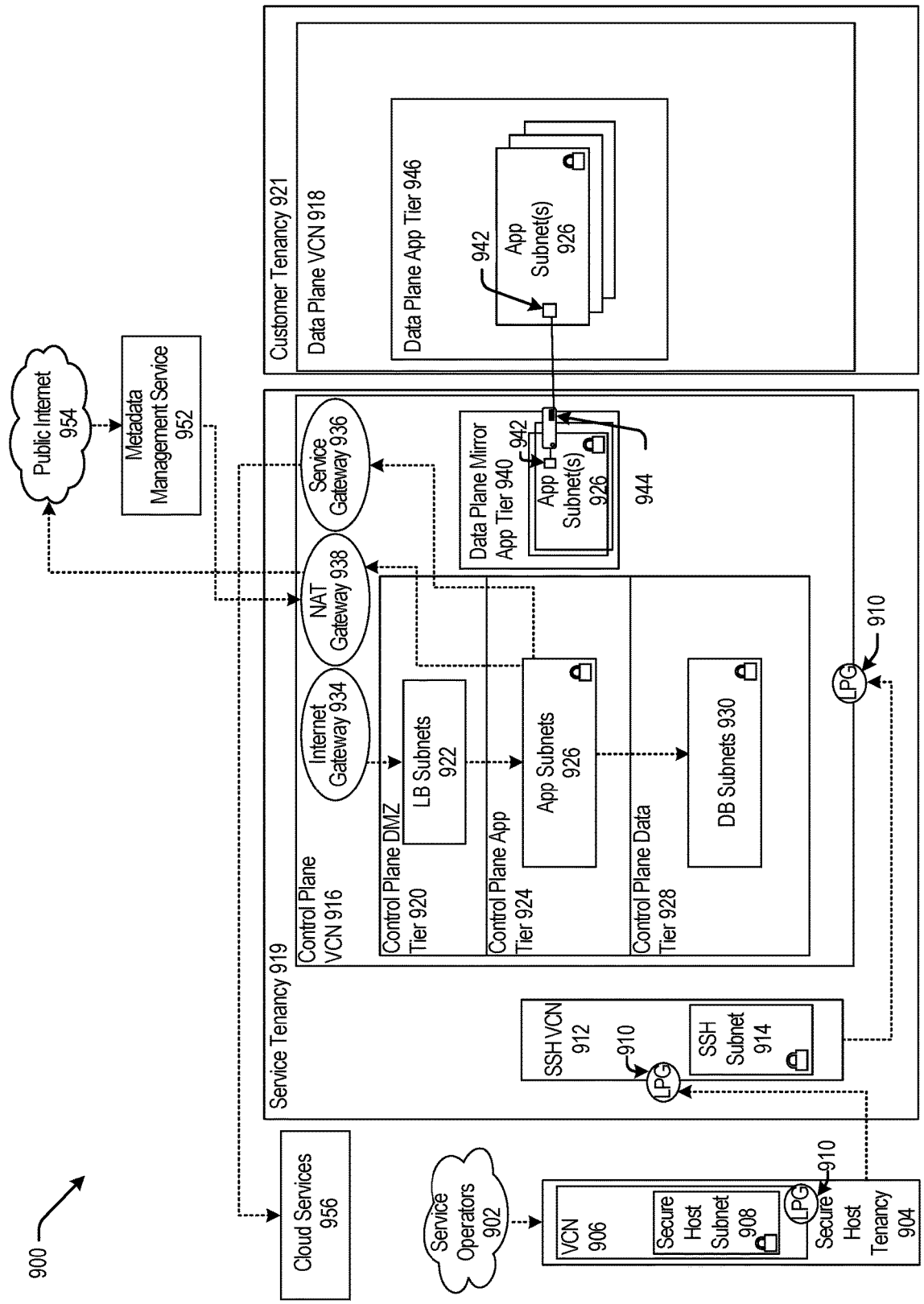
FIG. 9 is a block diagram illustrating another pattern for implementing a cloud infrastructure as a service system, according to one or more embodiments.

FIG. 9 is a block diagram 900 illustrating another example pattern of an IaaS architecture, according to at least one embodiment. Service operators 902 (e.g., service operators 802 of FIG. 8) can be communicatively coupled to a secure host tenancy 904 (e.g., the secure host tenancy 804 of FIG. 8) that can include a virtual cloud network (VCN) 906 (e.g., the VCN 806 of FIG. 8) and a secure host subnet 908 (e.g., the secure host subnet 808 of FIG. 8). The VCN 906 can include a local peering gateway (LPG) 910 (e.g., the LPG 810 of FIG. 8) that can be communicatively coupled to a secure shell (SSH) VCN 912 (e.g., the SSH VCN 812 of FIG. 8) via an LPG 810 contained in the SSH VCN 912. The SSH VCN 912 can include an SSH subnet 914 (e.g., the SSH subnet 814 of FIG. 8), and the SSH VCN 912 can be communicatively coupled to a control plane VCN 916 (e.g., the control plane VCN 816 of FIG. 8) via an LPG 910 contained in the control plane VCN 916. The control plane VCN 916 can be contained in a service tenancy 919 (e.g., the service tenancy 819 of FIG. 8), and the data plane VCN 918 (e.g., the data plane VCN 818 of FIG. 8) can be contained in a customer tenancy 921 that may be owned or operated by users, or customers, of the system.

The control plane VCN 916 can include a control plane DMZ tier 920 (e.g., the control plane DMZ tier 820 of FIG. 8) that can include LB subnet(s) 922 (e.g., LB subnet(s) 822 of FIG. 8), a control plane app tier 924 (e.g., the control plane app tier 824 of FIG. 8) that can include app subnet(s) 926 (e.g., app subnet(s) 826 of FIG. 8), a control plane data tier 928 (e.g., the control plane data tier 828 of FIG. 8) that can include database (DB) subnet(s) 930 (e.g., similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g., the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g., the service gateway 836 of FIG. 8) and a network address translation (NAT) gateway 938 (e.g., the NAT gateway 838 of FIG. 8). The control plane VCN 916 can include the service gateway 936 and the NAT gateway 938.

The control plane VCN 916 can include a data plane mirror app tier 940 (e.g., the data plane mirror app tier 840 of FIG. 8) that can include app subnet(s) 926. The app subnet(s) 926 contained in the data plane mirror app tier 940 can include a virtual network interface controller (VNIC) 942 (e.g., the VNIC of 842) that can execute a compute instance 944 (e.g., similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g., the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g., the metadata management service 852 of FIG. 8) that can be communicatively coupled to public Internet 954 (e.g., public Internet 854 of FIG. 8). Public Internet 954 can be communicatively coupled to the NAT gateway 938 contained in the control plane VCN 916. The service gateway 936 contained in the control plane VCN 916 can be communicatively couple to cloud services 956 (e.g., cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow resources, that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8," may be located in Region 1 and in "Region 2." If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
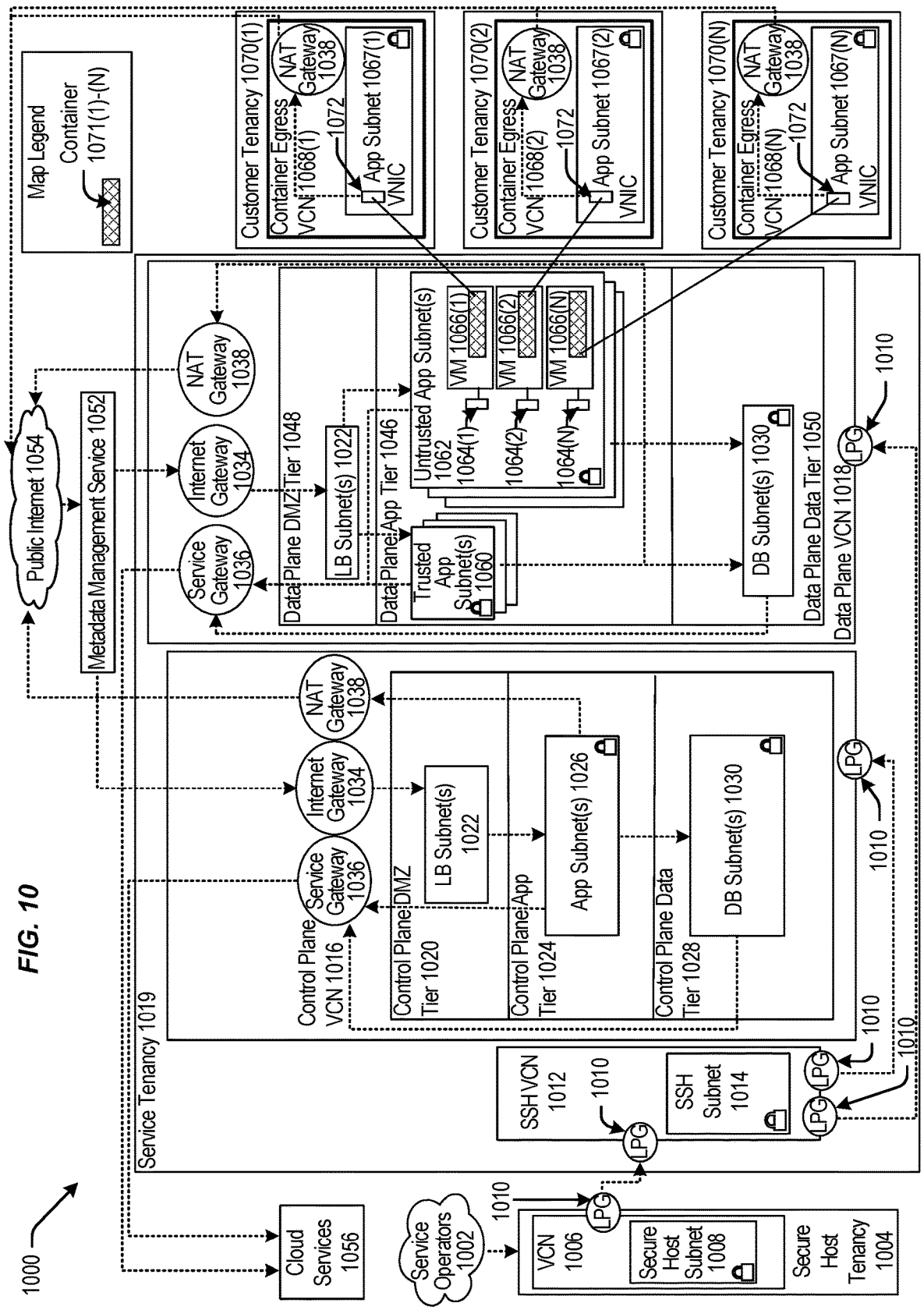
FIG. 10 is a block diagram illustrating another pattern for implementing a cloud infrastructure as a service system, according to one or more embodiments.

FIG. 10 is a block diagram 1000 illustrating another example pattern of an IaaS architecture, according to at least one embodiment. Service operators 1002 (e.g., service operators 802 of FIG. 8) can be communicatively coupled to a secure host tenancy 1004 (e.g., the secure host tenancy 804 of FIG. 8) that can include a virtual cloud network (VCN) 1006 (e.g., the VCN 806 of FIG. 8) and a secure host subnet 1008 (e.g., the secure host subnet 808 of FIG. 8). The VCN 1006 can include an LPG 1010 (e.g., the LPG 810 of FIG. 8) that can be communicatively coupled to an SSH VCN 1012 (e.g., the SSH VCN 812 of FIG. 8) via an LPG 1010 contained in the SSH VCN 1012. The SSH VCN 1012 can include an SSH subnet 1014 (e.g., the SSH subnet 814 of FIG. 8), and the SSH VCN 1012 can be communicatively coupled to a control plane VCN 1016 (e.g., the control plane VCN 816 of FIG. 8) via an LPG 1010 contained in the control plane VCN 1016 and to a data plane VCN 1018 (e.g., the data plane 818 of FIG. 8) via an LPG 1010 contained in the data plane VCN 1018. The control plane VCN 1016 and the data plane VCN 1018 can be contained in a service tenancy 1019 (e.g., the service tenancy 819 of FIG. 8).

The control plane VCN 1016 can include a control plane DMZ tier 1020 (e.g., the control plane DMZ tier 820 of FIG. 8) that can include load balancer (LB) subnet(s) 1022 (e.g., LB subnet(s) 822 of FIG. 8), a control plane app tier 1024 (e.g., the control plane app tier 824 of FIG. 8) that can include app subnet(s) 1026 (e.g., similar to app subnet(s) 826 of FIG. 8), a control plane data tier 1028 (e.g., the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 8) and a network address translation (NAT) gateway 1038 (e.g., the NAT gateway 838 of FIG. 8). The control plane VCN 1016 can include the service gateway 1036 and the NAT gateway 1038.

The data plane VCN 1018 can include a data plane app tier 1046 (e.g., the data plane app tier 846 of FIG. 8), a data plane DMZ tier 1048 (e.g., the data plane DMZ tier 848 of FIG. 8), and a data plane data tier 1050 (e.g., the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant VM 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g., public Internet 854 of FIG. 8).

The Internet gateway 1034 contained in the control plane VCN 1016 and contained in the data plane VCN 1018 can be communicatively coupled to a metadata management service 1052 (e.g., the metadata management system 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1046. Code to run the function may be executed in the VMs 1066(1)-(N), and the code may not be configured to run anywhere else on the data plane VCN 1018. Each VM 1066(1)-(N) may be connected to one customer tenancy 1070. Respective containers 1071(1)-(N) contained in the VMs 1066(1)-(N) may be configured to run the code. In this case, there can be a dual isolation (e.g., the containers 1071(1)-(N) running code, where the containers 1071(1)-(N) may be contained in at least the VM 1066(1)-(N) that are contained in the untrusted app subnet(s) 1062), which may help prevent incorrect or otherwise undesirable code from damaging the network of the IaaS provider or from damaging a network of a different customer. The containers 1071(1)-(N) may be communicatively coupled to the customer tenancy 1070 and may be configured to transmit or receive data from the customer tenancy 1070. The containers 1071(1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the VM 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
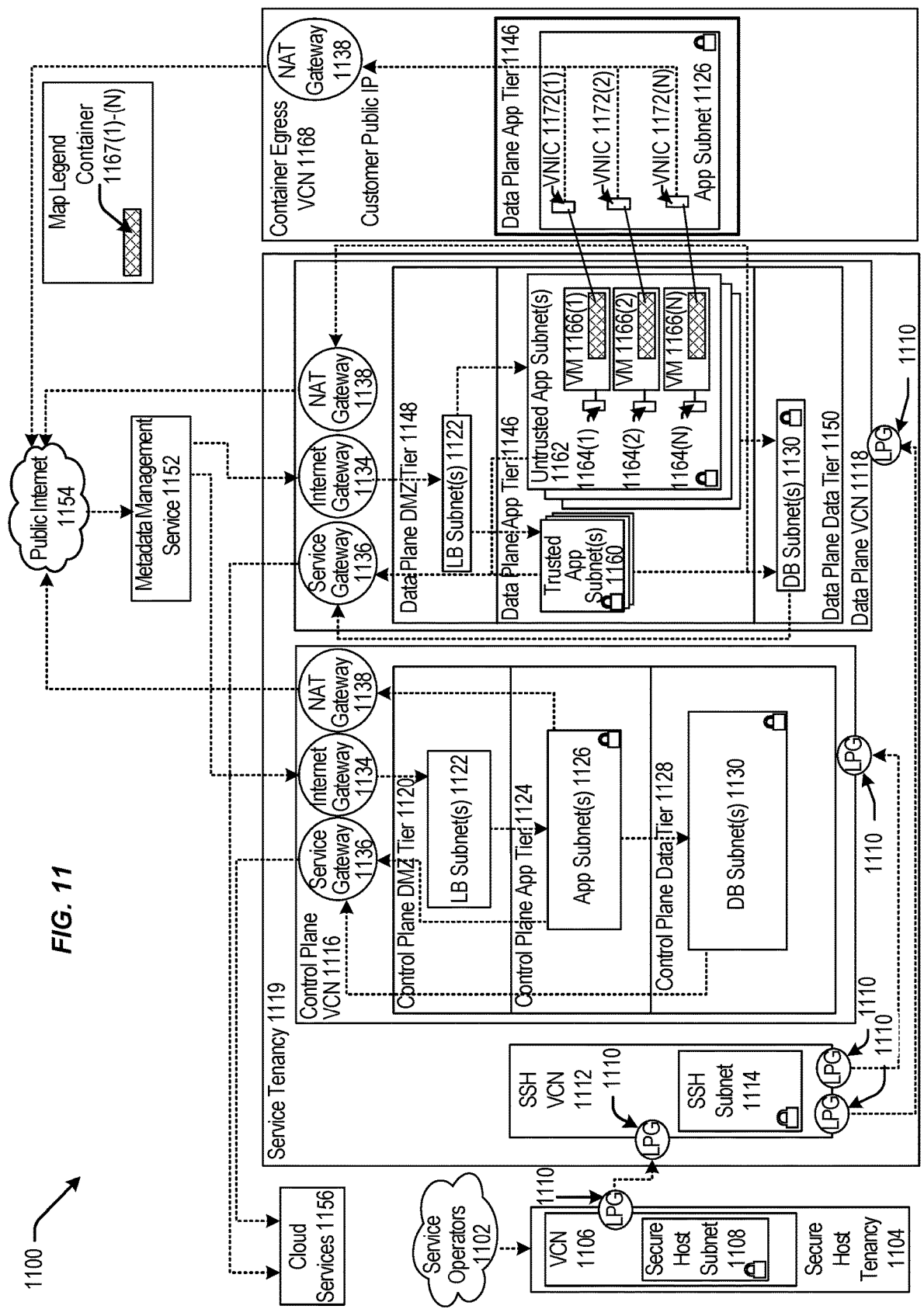
FIG. 11 is a block diagram illustrating another pattern for implementing a cloud infrastructure as a service system, according to one or more embodiments.

FIG. 11 is a block diagram 1100 illustrating another example pattern of an IaaS architecture, according to at least one embodiment. Service operators 1102 (e.g., service operators 802 of FIG. 8) can be communicatively coupled to a secure host tenancy 1104 (e.g., the secure host tenancy 804 of FIG. 8) that can include a virtual cloud network (VCN) 1106 (e.g., the VCN 806 of FIG. 8) and a secure host subnet 1108 (e.g., the secure host subnet 808 of FIG. 8). The VCN 1106 can include an LPG 1110 (e.g., the LPG 810 of FIG. 8) that can be communicatively coupled to an SSH VCN 1112 (e.g., the SSH VCN 812 of FIG. 8) via an LPG 1110 contained in the SSH VCN 1112. The SSH VCN 1112 can include an SSH subnet 1114 (e.g., the SSH subnet 814 of FIG. 8), and the SSH VCN 1112 can be communicatively coupled to a control plane VCN 1116 (e.g., the control plane VCN 816 of FIG. 8) via an LPG 1110 contained in the control plane VCN 1116 and to a data plane VCN 1118 (e.g., the data plane 818 of FIG. 8) via an LPG 1110 contained in the data plane VCN 1118. The control plane VCN 1116 and the data plane VCN 1118 can be contained in a service tenancy 1119 (e.g., the service tenancy 819 of FIG. 8).

The control plane VCN 1116 can include a control plane DMZ tier 1120 (e.g., the control plane DMZ tier 820 of FIG. 8) that can include LB subnet(s) 1122 (e.g., LB subnet(s) 822 of FIG. 8), a control plane app tier 1124 (e.g., the control plane app tier 824 of FIG. 8) that can include app subnet(s) 1126 (e.g., app subnet(s) 826 of FIG. 8), a control plane data tier 1128 (e.g., the control plane data tier 828 of FIG. 8) that can include DB subnet(s) 1130 (e.g., DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g., the service gateway of FIG. 8) and a network address translation (NAT) gateway 1138 (e.g., the NAT gateway 838 of FIG. 8). The control plane VCN 1116 can include the service gateway 1136 and the NAT gateway 1138.

The data plane VCN 1118 can include a data plane app tier 1146 (e.g., the data plane app tier 846 of FIG. 8), a data plane DMZ tier 1148 (e.g., the data plane DMZ tier 848 of FIG. 8), and a data plane data tier 1150 (e.g., the data plane data tier 850 of FIG. 8). The data plane DMZ tier 1148 can include LB subnet(s) 1122 that can be communicatively coupled to trusted app subnet(s) 1160 (e.g., trusted app subnet(s) 1060 of FIG. 10) and untrusted app subnet(s) 1162 (e.g., untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant VM 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g., public Internet 854 of FIG. 8).

The Internet gateway 1134 contained in the control plane VCN 1116 and contained in the data plane VCN 1118 can be communicatively coupled to a metadata management service 1152 (e.g., the metadata management system 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the VMs 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 12:
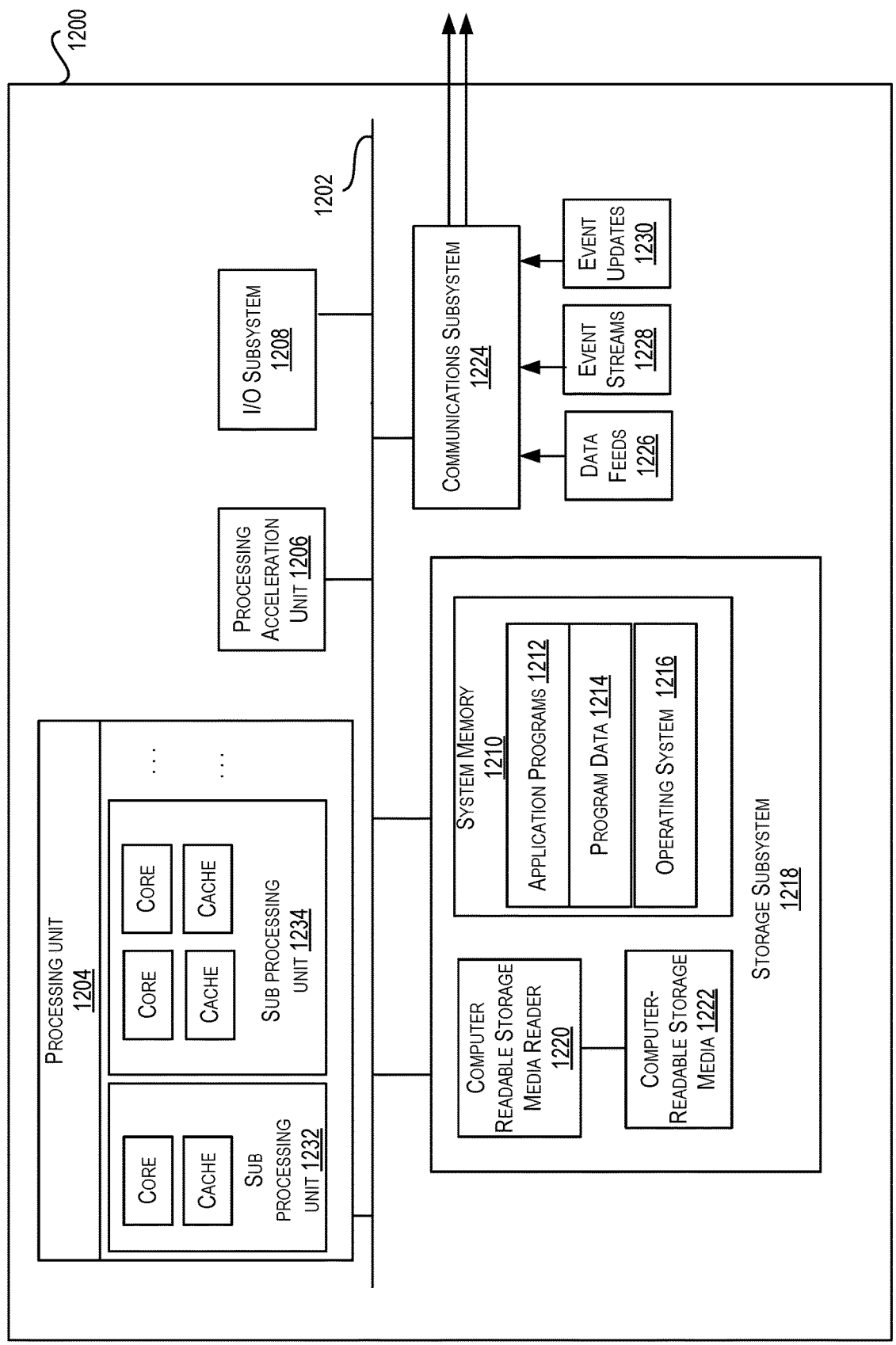
FIG. 12 is a block diagram illustrating an example computer system, according to one or more embodiments.

FIG. 12 illustrates an example computer system 1200, in which various embodiments may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program services that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 1218 may also provide a tangible computer-readable storage medium for storing the basic programming and data constructs that provide the functionality of some embodiments. Software (programs, code services, instructions) that when executed by a processor provide the functionality described above may be stored in storage subsystem 1218. These software services or instructions may be executed by processing unit 1204. Storage subsystem 1218 may also provide a repository for storing data used in accordance with the present disclosure.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program services, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising;
receiving, by a computing device, a first workflow request, the device comprising a first launcher in communication with a second launcher via a shared queue, and a first duplicate of the first workflow request being stored in the shared queue to be retrieved by the second launcher upon an elapsing of a threshold time interval;
transmitting, by the computing device, the first workflow request to an application for executing the first workflow request, the transmission being prior to the threshold time elapsing;
determining, by the computing device, whether the application initiated a workflow to process the first workflow request;
in accordance with determining that the application initiated the workflow process to process the first workflow request and prior to the threshold time interval elapsing, updating, by the computing device, the first duplicate of the first workflow request stored at the shared queue;
generating a second duplicate of the first workflow request;
receiving a second workflow request via an application programming interface (API);
compressing the second duplicate of the first workflow request and the second workflow request into a batch; and
updating a first duplicate of the second workflow request based at least in part on the compression.

2. The method of claim 1, wherein the method further comprises generating a third launcher, based at least in part on a real-time performance metric of the device, wherein the second workflow request is received via the third launcher.

3. The method of claim 1, wherein updating the first duplicate of the first workflow request comprising generating an instruction based at least in part on compression of the second workflow request and the second duplicate of the first workflow request.

4. The method of claim 1, wherein the threshold time interval is based at least in part on a projected latency between the first duplicate of the first workflow request being loaded onto the shared queue and the second launcher retrieving the first duplicate of the first workflow request from the shared queue.

5. The method of claim 1, wherein the first workflow request is received via an in-memory queue.

6. The method of claim 1, wherein updating the duplicate of the first workflow request comprises deleting the duplicate of the first workflow request.

7. A device, comprising:
a processor; and
a computer-readable medium including instructions that, when executed by the processor, cause the processor to perform operations comprising:
receiving, by a computing device, a first workflow request, the device comprising a first launcher in communication with a second launcher via a shared queue, and a first duplicate of the first workflow request being stored in the shared queue to be retrieved by the second launcher upon an elapsing of a threshold time interval;

transmitting, by the computing device, the first workflow request to an application for executing the first workflow request, the transmission being prior to the threshold time elapsing;

determining, by the computing device, whether the application initiated a workflow to process the first workflow request;

in accordance with determining that the application initiated the workflow process to process the first workflow request and prior to the threshold time interval elapsing, updating, by the computing device, the first duplicate of the first workflow request stored at the shared queue;

generating a second duplicate of the first workflow request;

receiving a second workflow request via an application programming interface;

compressing the second duplicate of the first workflow request and the second workflow request into a batch; and updating a first duplicate of the second workflow request based at least in part on the compression.

8. The device of claim 7, wherein the instructions that, when executed by the processor, cause the processor to perform operations comprising generating a third launcher, based at least in part on a real-time performance metric of the device, wherein the second workflow request is received via the third launcher.

9. The device of claim 7, wherein generating the instruction is further based at least in part on compression of the second workflow request and the second duplicate of the first workflow request.

10. The device of claim 7, wherein the threshold time interval is based at least in part on a projected latency between the first duplicate of the first workflow request being loaded onto the shared queue and the second launcher retrieving the first duplicate of the first workflow request from the shared queue.

11. The device of claim 7, wherein the first workflow request is received via an in-memory queue.

12. The device of claim 7, wherein updating the duplicate of the first workflow request comprises deleting the duplicate of the first workflow request.

13. A non-transitory, computer-readable medium having stored thereon a sequence of instructions which, when executed, causes a processor to perform operations comprising:

receiving, by a computing device, a first workflow request, the device comprising a first launcher in communication with a second launcher via a shared queue, and a first duplicate of the first workflow request being stored in the shared queue to be retrieved by the second launcher upon an elapsing of a threshold time interval;

transmitting, by the computing device, the first workflow request to an application for executing the first workflow request, the transmission being prior to the threshold time elapsing;

determining, by the computing device, whether the application initiated a workflow to process the first workflow request; and in accordance with determining that the application initiated the workflow process to process the first workflow request and prior to the threshold time interval elapsing, updating, by the computing device, the first duplicate of the first workflow request stored at the shared queue;

generating a second duplicate of the first workflow request;

receiving a second workflow request via an application programming interface;

compressing the second duplicate of the first workflow request and the second workflow request into a batch; and updating a first duplicate of the second workflow request based at least in part on the compression.

14. The non-transitory, computer-readable medium of claim 13, wherein the instructions that, when executed by the processor, cause the processor to perform operations comprising generating a third launcher, based at least in part on a real-time performance metric of the device, wherein the second workflow request is received via the third launcher.

15. The non-transitory, computer-readable medium of claim 13, wherein generating the instruction is further based at least in part on compression of the second workflow request and the second duplicate of the first workflow request.

16. The non-transitory, computer-readable medium of claim 13, wherein the threshold time interval is based at least in part on a projected latency between the first duplicate of the first workflow request being loaded onto the shared queue and the second launcher retrieving the first duplicate of the first workflow request from the shared queue.

17. The non-transitory, computer-readable medium of claim 13, wherein the first workflow request is received via an in-memory queue.

* * * * *